July 23, 1957  H. I. BECKER  2,800,616
LOW VOLTAGE ELECTROLYTIC CAPACITOR
Filed April 14, 1954

Inventor:
Howard I. Becker,
by Claude A. Mott.
His Attorney.

United States Patent Office 2,800,616
Patented July 23, 1957

2,800,616

LOW VOLTAGE ELECTROLYTIC CAPACITOR

Howard I. Becker, Vischers Ferry, N. Y., assignor to General Electric Company, a corporation of New York Application April 14, 1954, Serial No. 423,042

4 Claims. (Cl. 317—230)

This invention relates to an electrical energy storing device and more particularly to a low voltage, high capacitance electrolytic capacitor.

Presently known electrolytic capacitors of reasonably high capacitance become impractical when used with voltages of 2.5 volts or less. Yet there are many uses for a capacitor having high capacitance within this voltage range. Among these uses are the smoothing of a double wave rectified alternating current, use across a low voltage rectified A. C. supply for a quick filament warm up in circuits using small tubes, and low voltage filtering uses.

Heretofore, several limitations have prevented the use of electrolytic capacitors in the uses mentioned above. Among these limitations have been the large size of the capacitor required to give the capacitance needed and the necessity for connecting the capacitor in the circuit with a fixed polarity.

It is accordingly an important object of this invention to overcome the above limitations by providing a capacitor which is effective for the uses mentioned.

Other objects of the invention are to provide:

A low voltage, high capacitance electrolytic capacitor enabling substantial savings in size, weight and cost;

A low voltage, high capacitance electrolytic capacitor having the ability to adjust itself internally to either polarity;

A low voltage, high capacitance electrolytic capacitor having like carbon electrodes and which thus can be left on short circuit for an indefinite period of time without significant damage or breakdown of its qualities;

An electrolytic capacitor having electrodes and an electrolyte such that at low voltages, a considerably higher capacitance is obtainable than has heretofore been possible with capacitors of comparable size;

A light weight, compact, low voltage, high capacitance electrolytic capacitor which operates with a high efficiency;

An electrolytic capacitor having a plurality of low voltage, high capacitance cells of the type described;

An electrolytic capacitor having a plurality of low voltage, high capacitance cells of the type described, and means between the cells for preventing neutralization of positive and negative charges between adjacent cells.

These and other objects will become apparent and the invention will be better understood upon perusal of the following description taken in connection with the accompanying drawing, and the scope of the invention will be pointed out in the appended claims.

In the drawings which are illustrative of the present invention:

Briefly stated, in accordance with one aspect of this invention, a low voltage capacitor is provided including at least two spaced, porous carbon electrodes each having a porosity at least as great as fired tar lampblack and an electrolyte in contact with the electrodes. For higher voltage ratings a capacitor is provided having a plurality of such carbon electrode cells connected in series. Means are also provided for preventing neutralization of charges between adjacent cells of the plural cell capacitor.

Figure 1:
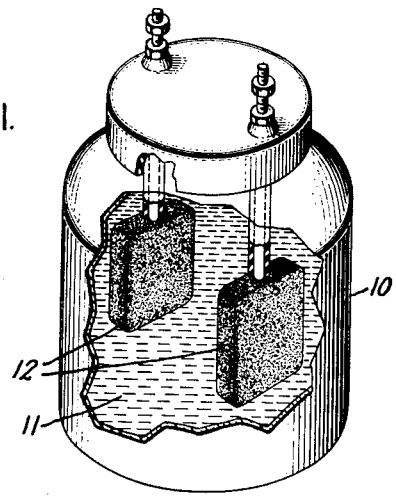
Fig. 1 is a view in perspective, partly broken away, illustrating the principles of this invention.

Referring more particularly to the drawings, Fig. 1 is illustrative of the principle employed in this invention. A container of suitable insulating material 10 is partially filled with an electrolyte 11. A pair of porous carbon electrodes 12 are supported in the container 10 and are at least partially immersed in the electrolyte 11.

Figure 2:
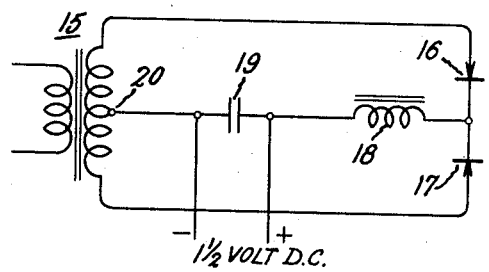
Fig. 2 is a circuit diagram illustrating one use for the electrolytic capacitor of this invention.

Fig. 2 is illustrative of a circuit showing one use for the electrolytic capacitor of this invention. Alternate half cycles from the secondary of transformer 15 pass through rectifiers 16 and 17, respectively, and choke coil 18, thence to one electrode of the capacitor 19. The other electrode of the capacitor is connected to the center tap 20 of the transformer secondary. The output voltage of this double wave rectifier alternating current circuit is thus effectively smoothed by the use of capacitor 19.

Figure 3:
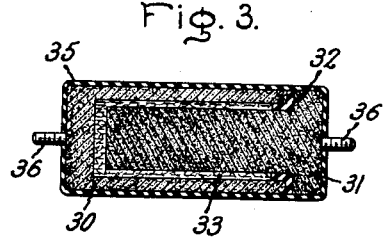
Fig. 3 is a cross sectional view of an electrolytic capacitor embodying the principles of this invention.

In Fig. 3 is shown a more practical form which the electrolytic capacitor of this invention can take. In this form mating porous carbon electrodes 30 and 31 are maintained in spaced relation by a suitable insulating material which is resistant to the action of the electrolyte, preferably in the form of a rubber gasket 32. The space between the carbon electrodes 30 and 31 is occupied by the electrolyte 33 and by a suitable filler such as Pyrex glass wool. A container 35 of suitable insulating material is provided to hermetically seal the described cell of the capacitor in a manner well known in the art. Electrical terminals 36 are in contact with the carbon electrodes 30 and 31 and serve to facilitate electrical connections to the capacitor.

It is not positively known exactly what takes place when the devices illustrated in Figs. 1 and 3 are used as energy storing devices, for example, as shown in Fig. 2. It is believed that the energy is stored on the surface of and in the pores of the porous carbon electrodes in the form of atomic hydrogen. However, tests have conclusively demonstrated that when used as a low voltage electrolytic capacitor, this device exhibits an exceptionally high capacitance, particularly in view of its small size.

By way of example, a capacitor cell was made up as illustrated in Fig. 3, the dimensions being 2 inches long by 1 inch in diameter. Tests showed that the device had an apparent capacitance of over 800,000 microfarads when used in a 1½ volt D. C. circuit. It has been found that the capacitance is governed by the surface area of the particles in the electrode, and of course the surface area spoken of includes the area of the internal particles of the electrodes since the electrode is of a porous carbon variety. As a rough approximation, the capacitance increases with the volume of the submerged porous electrode, the porous nature of the electrode being such that it will admit the atomic hydrogen. Capacitance values up to 10 farads per cubic inch of submerged porous carbon are obtainable, when used with 1½ volts D. C.

The preferred electrodes are made of sticks of fired tar lampblack composition as it has been found that electrodes of this material increase the capacitance of the cell from two to three times that of the next best grade of carbon. With two electrodes of fired tar lampblack ⅝ inches in diameter and 1¾ inches long, electrical storage capacitance up to 6 farads at 1½ volts D. C. was obtained. Thus, the high storage ability is one of the outstanding advantages of the use of porous carbon electrodes. Another important advantage is of course that carbon is not active with the electrolyte or with any impurities that may be in the electrolyte.

The electrolyte used with the capacitor of this invention can be a salt solution such as $NH_4Cl$ (Salammoniac) or an acid such as sulfuric acid and water, $H_2SO_4+H_2O$. While these electrolytes have been found to give desirable results, it is to be understood that the invention is not limited to use of these particular electrolytes and that other suitable electrolytes may be used.

Figure 4:
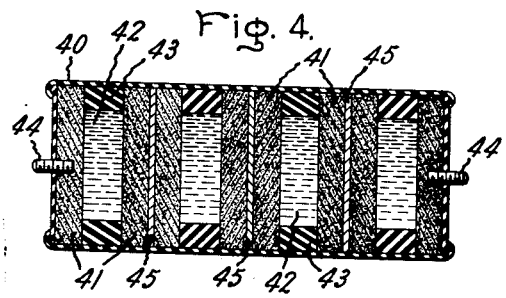
Fig. 4 is a cross sectional view of an electrolytic capacitor including a plurality of cells.
Figure 5:
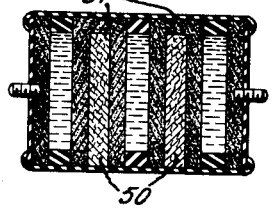
Fig. 5 is a fragmentary cross sectional view of a different embodiment of the invention shown in Fig. 4.

It has been stated that the capacitor of this invention is limited to low voltages. This is believed to be true because the voltage of ionization of an electrolyte is generally less than 2½ volts and because the charge is stored in the form of atomic hydrogen during ionization of the electrolyte. However, the principle of this invention is well adapted to use in capacitors requiring a higher voltage rating in that a plurality of the capacitor cells previously described can be connected together, for example as shown in Figs. 4 and 5. The Fig. 4 embodiment includes a container 40 housing four separate capacitor cells. Each of these cells is made up of a pair of spaced, porous carbon electrodes 41 and an electrolyte 42 in contact with the electrodes. Rubber rings 43 are used to seal the electrolyte within the cell and electrical terminals 44 are provided.

Means are provided between adjacent cells for preventing neutralization of the charges from cell to cell of the plural cell capacitor. As illustrated in Fig. 4, such means are in the form of conductive plates 45, preferably lead, separating adjacent cells. Alternatively, such spacing means may be provided by metal plating the surface of the carbon electrode, or in still another way, by metal spraying lead or other suitable conductive material on the surface of the electrode. It has been found that without the use of the means described above, the efficiency is low, presumably because of neutralization of the charges. It is believed that while in circuit the adjacent electrodes of different cells have opposite charges built up on their porous surfaces. Thus, on one electrode would be negative hydrogen charges and on the other electrode would be positive oxygen charges. These charges have a strong affinity for each other and apparently a portion of the hydrogen leaks through the carbon electrodes and is neutralized by charges on the positive electrode. The conductive plates 45 or other conductive means also serve to connect the cells in series.

Fig. 5 illustrates still another means for preventing neutralization of the charges between the adjacent cells of the capacitor of Fig. 4. In this embodiment, the means includes a suitable insulating material, for example, glass wool 50 disposed so as to provide an air space between the electrodes of adjacent cells. Conductors 51 connect adjacent cells in series.

It will be observed that the various embodiments of the electrolytic capacitor of this invention employ like porous carbon electrodes. It is, therefore, a very desirable feature of this invention that it eliminates the necessity of marking the polarity, as the described capacitors are internally adjustable with a minimum time delay to whichever direction of current flow they are connected. It is also to be noted that with capacitors made in accordance with the teachings of this invention, it has been found that there is no necessity for disconnecting the capacitor from the circuit in order to avoid short-circuit deterioration of the capacitor. The reasons for this are believed to be twofold: first the use of like porous carbon electrodes eliminates the battery action which frequently takes place in electrolytic capacitors having unlike electrodes or having metallic electrodes; secondly by using porous carbon electrodes there is little likelihood of metal plating action on a given electrode, either from another electrode or from impurities in the electrolyte.

While the preferred embodiments of this invention have been illustrated and described, the invention is not to be construed as limited to the embodiments shown. Thus, it is intended in the appended claims to cover all changes and modifications of the embodiments of the invention disclosed which do not depart from the spirit and scope of the invention.

What I claim as new and desire to secure by Letters Patent of the United States is:

1. An electrolytic capacitor comprising a container made of insulating material, at least two porous carbon electrodes supported in spaced relation within the container, each of said electrodes having a porosity at least as great as fired tar lampblack and an electrolyte in contact with at least part of each of said electrodes, said capacitor when used in circuit applications of less than 2.5 volts having unusually high capacitance compared with that obtainable from known capacitors of comparable size.

2. An electrolytic capacitor comprising a plurality of series-connected cells adapted to store charges, each cell including a pair of spaced, porous carbon electrodes each having a porosity at least as great as fired tar lampblack and an electrolyte in contact with said electrodes, and means between the cells for preventing neutralization of the charges between the adjacent carbon electrodes of the different cells.

3. A plural cell capacitor as set forth in claim 2, said means including conductive metal disposed between the carbon electrodes of adjacent cells.

4. A plural cell capacitor as set forth in claim 2, said means including insulating filler material providing an air space between the carbon electrodes of adjacent cells.

References Cited in the file of this patent

UNITED STATES PATENTS

| 1,966,297 | Jackson | July 10, 1934 |

FOREIGN PATENTS

| 648,716 | France | Dec. 13, 1948 |